US009431052B2

(12) United States Patent
Oberg et al.

(10) Patent No.: US 9,431,052 B2
(45) Date of Patent: Aug. 30, 2016

(54) TWO DIMENSIONAL MAGNETIC RECORDING SYSTEMS, DEVICES AND METHODS

(71) Applicant: Marvell World Trade Ltd., St. Michael (BB)

(72) Inventors: Mats Oberg, San Jose, CA (US); Nitin Nangare, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/749,492

(22) Filed: Jun. 24, 2015

(65) Prior Publication Data

US 2015/0380048 A1  Dec. 31, 2015

Related U.S. Application Data

(60) Provisional application No. 62/017,424, filed on Jun. 26, 2014.

(51) Int. Cl.

| G11B 5/09 | (2006.01) |
|---|---|
| G11B 20/10 | (2006.01) |
| G11B 5/012 | (2006.01) |
| G11B 5/49 | (2006.01) |
| G11B 5/39 | (2006.01) |

(52) U.S. Cl.
CPC ......... *G11B 20/10046* (2013.01); *G11B 5/012* (2013.01); *G11B 20/10009* (2013.01); *G11B 20/10037* (2013.01); *G11B 5/3964* (2013.01); *G11B 5/4976* (2013.01)

(58) Field of Classification Search
CPC .............. G11B 20/10009; G11B 5/09; G11B 2220/90; G11B 2220/20; G11B 20/14013; G11B 15/1875; G11B 15/44; G11B 5/6005; G11B 5/59633; G11B 5/4976; G11B 5/012
USPC ............ 360/39, 51, 75, 77.14, 73.08, 73.04, 360/73.07, 65; 369/47.1, 47.27, 44.37
See application file for complete search history.

(56) References Cited

U.S. PATENT DOCUMENTS

| 5,737,742 A | 4/1998 | Achiwa |
|---|---|---|
| 5,835,469 A | 11/1998 | Maeda |

(Continued)

OTHER PUBLICATIONS

Cyclic redundancy check, Wikipedia, http://en.wikipedia.org/wiki/Cyclic_redundancy_check, downloaded Apr. 30, 2014, 11 pages.

(Continued)

*Primary Examiner* — Nabil Hindi

(57) ABSTRACT

The present disclosure describes systems and techniques relating to storage devices, such as storage devices that employ Two Dimensional Magnetic Recording (TDMR). According to an aspect of the described systems and techniques, a device includes: a first read channel to process a first input signal obtained from a Two Dimensional Magnetic Recording (TDMR) storage medium using a first read head, wherein the first read channel includes a first analog to digital converter (ADC); a second read channel to process a second input signal obtained from the TDMR, storage medium using a second read head, wherein the second read channel includes a second ADC; and a single digital timing loop (DTL) for both the first read channel and the second read channel, wherein the single DTL is configured to control interpolation of timing of sampling for the first and second ADCs.

18 Claims, 7 Drawing Sheets

(56) References Cited

U.S. PATENT DOCUMENTS

| | | |
|---|---|---|
| 6,185,063 B1 | 2/2001 | Cameron |
| 6,618,299 B2 | 9/2003 | Sohn |
| 6,967,810 B2 | 11/2005 | Kasiraj |
| 7,664,903 B2 | 2/2010 | Belonoznik |
| 7,702,880 B2 | 4/2010 | Chang |
| 7,975,090 B2 | 7/2011 | Auernhammer |
| 8,041,884 B2 | 10/2011 | Chang |
| 8,078,794 B2 | 12/2011 | Lee |
| 8,185,713 B2 | 5/2012 | Shin |
| 8,300,339 B1 | 10/2012 | Nangare |
| 8,392,687 B2 | 3/2013 | Asnaashari |
| 8,402,217 B2 | 3/2013 | Burd |
| 8,447,915 B2 | 5/2013 | Araki |
| 8,484,414 B2 | 7/2013 | Sugimoto |
| 8,599,508 B1 | 12/2013 | Burd |
| 8,625,215 B1 | 1/2014 | Burd |
| 8,638,513 B1 * | 1/2014 | Burd ............... G11B 5/012 360/39 |
| 8,671,326 B1 | 3/2014 | Tang |
| 8,699,159 B1 | 4/2014 | Malina |
| 8,699,162 B1 | 4/2014 | Grobis |
| 8,725,944 B2 | 5/2014 | Burd |
| 8,749,905 B1 | 6/2014 | Malina |
| 8,751,860 B2 | 6/2014 | Feeley |
| 8,806,300 B2 | 8/2014 | Kitahara |
| 8,977,813 B2 | 3/2015 | Burd |
| 8,988,800 B1 | 3/2015 | Varnica |
| 2007/0076313 A1 | 4/2007 | Hutchins |
| 2007/0177292 A1 | 8/2007 | Bui |
| 2007/0242378 A1 | 10/2007 | Ikegami |
| 2009/0228762 A1 | 9/2009 | Kurashige |
| 2010/0185802 A1 | 7/2010 | Asnaashari |
| 2010/0211737 A1 | 8/2010 | Flynn |
| 2010/0217919 A1 | 8/2010 | Sukegawa |
| 2010/0313065 A1 | 12/2010 | Feeley |
| 2011/0010489 A1 | 1/2011 | Yeh |
| 2011/0191521 A1 | 8/2011 | Araki |
| 2012/0060073 A1 | 3/2012 | Itakura |
| 2014/0055881 A1 | 2/2014 | Zaharris |
| 2014/0237287 A1 | 8/2014 | Burd |
| 2014/0281183 A1 | 9/2014 | Edgar |
| 2014/0281185 A1 | 9/2014 | Edgar |
| 2015/0081925 A1 | 3/2015 | Mapp |
| 2015/0178161 A1 | 6/2015 | Burd |

OTHER PUBLICATIONS

Shingled Magnetic Recording (SMR), http://www.hgst.com/science-of-storage/emerging-technologies/shingled-magnetic-recording, downloaded Apr. 30, 2014, 1 page.

Low-density parity-check code, Wikipedia, http://en.wikipedia.org/wiki/LDPC, downloaded Apr. 30, 2014, 7 pages.

Suresh et al., "Shingled Magnetic Recording for Big Data Applications", Carnegie Mellon University, Parallel Data Laboratory, CMU-PDL-12-105, May 2012, 29 pages.

Schwarz et al., "RAID Organization and Performance," Jun. 1992, Distributed Computing Systems, Proceedings of the 12th International Conference on Parallel and Distributed Systems, 9 pages.

Notification of Transmittal of the International Search Report and the Written Opinion, International Application No. PCT/IB2015/054801, mailed Aug. 31, 2015, 10 pages.

* cited by examiner

TWO DIMENSIONAL MAGNETIC RECORDING SYSTEMS, DEVICES AND METHODS

CROSS REFERENCE TO RELATED APPLICATIONS

This application claims the benefit of the priority of U.S. Provisional Application Ser. No. 62/017,424, filed Jun. 26, 2014 and entitled "TWO DIMENSIONAL MAGNETIC RECORDING SYSTEM", which is incorporated herein by reference.

BACKGROUND

The present disclosure describes systems and techniques relating to storage devices, such as Two Dimensional Magnetic Recording (TDMR) storage devices.

Various mediums are used to create storage devices for use in computing systems. In magnetic-medium-based storage devices, data can be stored on circular, concentric tracks on a magnetic disk surface. A read-write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing.

To increase the amount data that is stored in magnetic recording systems, smaller amounts of the magnetic medium have been employed to store each respective bit of data by using a smaller read-write head and corresponding track pitch, and by reducing the size of guard bands on either side of each track. As the recording densities have increased, various error correction techniques have been employed to assist in reading back the bits of data. In addition, in order to increase recording densities still further, some have proposed Shingled Magnetic Recording (SMR) to shrink the track pitch still further and remove the guard bands between tracks, which allows more tracks to fit on the recording medium. In SMR, the tracks are written so that one track partially overlaps the previous track.

Further, some have also proposed Two Dimensional Magnetic Recording (TDMR) to use in conjunction with SMR. As the track pitch gets smaller in SMR, at some point the one dimensional (1D) codes and detectors will not be able to handle the Inter Track Interference (ITI) from tracks adjacent to the one being read. In a 1D channel, the ITI negatively impacts performance. But in a two dimensional (2D) channel, the ITI can potentially assist in making the bit decisions when reading data from a magnetic medium.

SUMMARY

The present disclosure describes systems and techniques relating to storage devices, such as storage devices that employ Two Dimensional Magnetic Recording (TDMR) media, devices and systems. According to an aspect of the described systems and techniques, a device includes: a first read channel to process a first input signal obtained from a Two Dimensional Magnetic Recording (TDMR) storage medium using a first read head, wherein the first read channel includes a first analog to digital converter (ADC); a second read channel to process a second input signal obtained from the TDMR storage medium using a second read head, wherein the second read channel includes a second ADC; and a single digital timing loop (DTL) for both the first read channel and the second read channel, wherein the single DTL is configured to control interpolation of timing of sampling for the first and second ADCs.

The device can also include a two dimensional equalizer coupled with output lines of the first read channel and the second read channel, wherein the first read head and the second read head are offset from each other in each of two dimensions. The first read channel can further include a first asymmetry correction block (ASC), a first variable gain amplifier (VGA), a first programmable delay line, and first finite impulse response filter (FIR); the second read channel can further include a second ASC, a second VGA, a second programmable delay line, and a second FIR; and FIR taps for the first FIR can be copied from the first FIR to the second FIR so the first FIR and the second FIR act as duplicates of each other.

The first read channel can further include a first asymmetry correction block (ASC), a first variable gain amplifier (VGA), and a first programmable delay line; the second read channel can further include a second ASC, a second VGA, and a second programmable delay line; and the device can further include a finite impulse response filter connected with an output line of the first programmable delay line, the finite impulse response filter lying outside of the first read channel and being configured and arranged to generate an error signal to drive the ASCs and VGAs of the first and second read channels, and to drive the single DTL.

The first read channel can further include a first asymmetry correction block (ASC), a first variable gain amplifier (VGA), and a first programmable delay line; the second read channel can further include a second ASC, a second VGA, and a second programmable delay line; and the device can be configured and arranged to generate an error signal from an output of the two dimensional equalizer to drive the ASCs and VGAs of the first and second read channels, and to drive the single DTL.

The device can include a single interpolator controlled by the single DTL to perform the same interpolation of timing of sampling for the first and second ADCs for both the first read channel and the second read channel; and coefficients on taps of respective FIR filters in the two dimensional equalizer can be adjusted to account for a timing difference between the first input signal and the second input signal, wherein the timing difference is a fractional amount of a single clock cycle of the device, the fractional amount being less than the time of the single clock cycle.

The above aspects described with respect to a device, can also be implemented as systems and methods. The first read channel, the second read channel, the single DTL, and the two dimensional equalizer can include circuitry located in a hard disk controller for a TDMR storage apparatus, the hard disk controller being included on a system on chip. A system can include: a Two Dimensional Magnetic Recording (TDMR) storage apparatus including a magnetic media disk, which is mounted on a spindle and motor assembly, and a head assembly including at least a first read head and a second read head, wherein the first read head and the second read head are offset from each other in each of two dimensions; and a storage controller coupled with the TDMR storage apparatus, the storage controller including a first read channel to process a first input signal obtained from the magnetic media disk of the TDMR storage apparatus using the first read head, and a second read channel to process a second input signal obtained from the magnetic media disk of the TDMR, storage apparatus using the second read head; wherein the first read channel includes a first analog to digital converter (ADC), the second read channel includes a second ADC; and wherein the storage controller includes a single digital timing loop (DTL) for both the first read channel and the second read channel, the single DTL being configured to control interpolation of timing of sampling for the first and second ADCs, and the storage controller includes a two dimensional equalizer coupled with output lines of the first read channel and the second read channel. Moreover, the storage controller can include features of the device, and in some implementations, the storage controller is integrated with the TDMR storage apparatus.

According to another aspect of the described systems and techniques, a method includes: processing, in a Two Dimensional Magnetic Recording (TDMR) device, a first analog read signal and a second analog read signal from a first portion and a second portion, respectively, of a TDMR storage medium, wherein each of the first portion and the second portion at least partially overlap with a track on the TDMR storage medium, and the processing includes separate analog to digital conversions of the respective first and second analog read signals; performing a single interpolation of timing of sampling for each of the separate analog to digital conversions; filtering digital output signals of the separate analog to digital conversions in a TDMR equalizer; and adjusting coefficients of filters in the TDMR equalizer to account for a timing difference between first and second analog read signals.

The timing difference can be a fractional amount of a single clock cycle of the TDMR device, the fractional amount being less than the time of the single clock cycle. Alternatively, the timing difference can be more than a fractional amount of a single clock cycle of the TDMR device. For example, if the FIRS are sufficiently long, integer amounts (plus fractional amounts) of up to 1 or 2 cycles of delay difference can be handled by the FIR structure. With longer FIRs, even more than 2 clock cycles can theoretically be handled.

The method can include generating an error signal from an output of the TDMR equalizer to drive asymmetry correction and variable gain amplification for both the first analog read signal and the second analog read signal, and to drive the single interpolation. The method can include: aligning a center of a first read head with a center of the track on the TDMR storage medium, the first analog read signal being from the first read head; filtering a digital output signal of a first of the separate analog to digital conversions using a finite impulse response filter; and generating an error signal from the filtered digital output signal to drive asymmetry correction and variable gain amplification for both the first analog read signal and the second analog read signal, and to drive the single interpolation.

The method can include aligning a center of a first read head with a center of the track on the TDMR storage medium, the first analog read signal being from the first read head; wherein the processing can further include: delaying a first digital output signal of a first of the separate analog to digital conversions by a first programmed amount of time; delaying a second digital output signal of a second of the separate analog to digital conversions by a second programmed amount of time; filtering the first delayed digital output signal using a first finite impulse response filter; filtering the second delayed digital output signal using a second finite impulse response filter; and copying taps from the first finite impulse response filter to the second finite impulse response filter so the first finite impulse response filter and the second finite impulse response filter act as duplicates of each other.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable hardware processor) to perform operations in support of the systems and devices, or simulations thereof for use in design of such systems and devices. Moreover, method implementations can be realized from a disclosed system, apparatus or device, and system, apparatus or device implementations can be realized from a disclosed method.

The disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described systems and techniques can result in one or more of the following advantages. The design of front end loops for TDMR read channels, and control thereof, can be made easier. Loop latency can be lowered. Hardware costs can be reduced. In addition, synchronization of data paths in TDMR read channels can be simplified. For example, read signals need not be fully aligned before being processed by a two dimensional equalizer, which can handle some of the signal alignment before the two signals are combined to form a final output signal for a track being read. Timing, gain, asymmetry, etc. frontend loops can nm on the error signal generated using 2D equalizer output and its corresponding Viterbi decisions, which is less noisy than an error signal generated using 1D FIR samples.

Details of one or more implementations are set forth in the accompanying drawings and the description below. Other features and advantages may be apparent in the description and drawings, and from the claims.

DRAWING DESCRIPTIONS

Like reference numbers and designations in the various drawings indicate like elements.

DETAILED DESCRIPTION

Figure 1A:
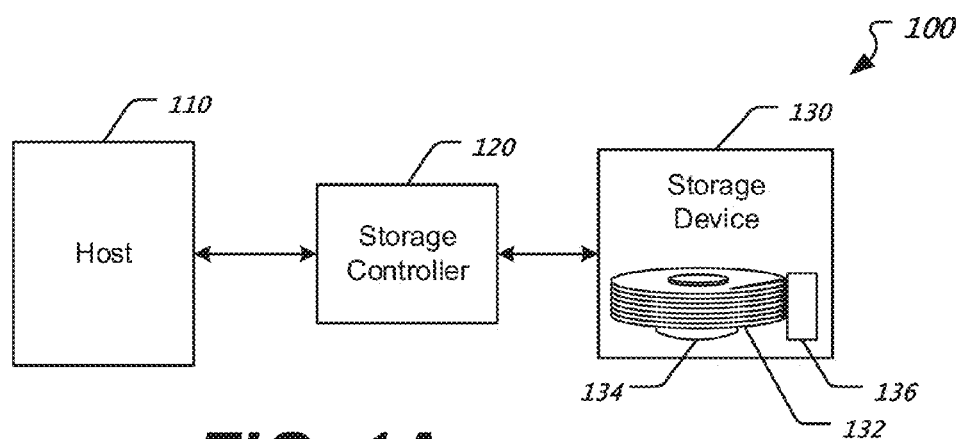
FIG. 1A shows an example of a data storage system.

FIG. 1A shows an example of a data storage system 100. A host 110 is coupled with a storage controller 120. The storage controller 120 interfaces with a storage device 130 and is configured to employ one or more of the systems and techniques described in this disclosure. The storage controller 120 can be implemented in various ways. For example, the storage controller 120 can include a printed circuit board (PCB) with various set of processing circuitries designed to handle designated tasks. The storage controller 120 can also include registers, volatile memory, non-volatile memory, or a combination of these, which can be used to buffer user data, hold control data or code, or both. In some implementations, the storage controller 120 includes a hardware processor that is programmed to perform specified tasks by firmware, software, or a combination of these.

The storage controller 120 can include a hardware interface through which commands from the host 110 can be received, and the storage controller 120 can decode such host commands and operate the storage device 130 in response thereto. The storage device 130 includes a magnetic recording medium, and can also include various additional types of storage mediums, such as an optical medium, a solid-state memory medium (e.g., NAND-based flash memory), or a combination thereof. In some implementations, the storage device 130 can be a hard disk drive (HDD). The storage device 130 can employ Shingled Magnetic Recording (SMR) and Two Dimensional Magnetic Recording (TDMR), which can be performed using various structures, such as a HDD or a tape drive. Moreover, the storage controller 120 can include various modules, such as a processing module, a control module, a detection module, and a compensation module, and the storage controller 120 can be a hard disk controller (HDC) and control HDD functions, such as controlling the speed of a spindle motor, controlling a voice coil motor (VCM), and managing power consumption.

In some implementations, the storage device 130 includes a disk drive with multiple magnetic media disks 132 mounted on an integrated spindle and motor assembly 134. The disk drive further includes a head assembly 136, which can include read signal circuitry, servo signal processing circuitry, and write signal circuitry. The disk drive can also include a PCB, with various drive electronics (e.g., a printed circuit board assembly (PCBA) with semiconductor devices). The magnetic media disks 132 can be coated with a particulate surface or a thin-film surface and can be written to, or read from, a single side or both sides of each disk. The head assembly 136 can include a preamp/writer, where head selection and sense current value(s) can be set, and the disk drive can be a TDMR disk drive that operates as described in further detail below.

Although shown as separate elements in FIG. 1A, e.g., with signals between the elements carried through a flexible printed cable, the various parts of the data storage system 100 can be integrated into various circuit devices, systems on chip, apparatus, or combinations thereof. The storage controller 120 can be integrated into the host 110 or into the storage device 130. In general, the systems and techniques described herein can be implemented as one or more devices, such as one or more integrated circuit (IC) devices, which may or may not be combined with a storage device at the point of sale.

The storage controller 120 can include a subset of the elements ascribed to it in various examples herein and/or other elements ascribed to the host 110 or the storage device 130. Thus, in some implementations, the storage controller 120 can be one or more IC chips (e.g., a combo chip or system on chip (SOC)), which can include read/write channel signal processing circuitry, which can further include error correction circuitry. The storage controller 120 can be a microprocessor and a hard disk controller, with associated read only memory (ROM) and random access memory (RAM) or interfaces thereto.

Figure 1B:
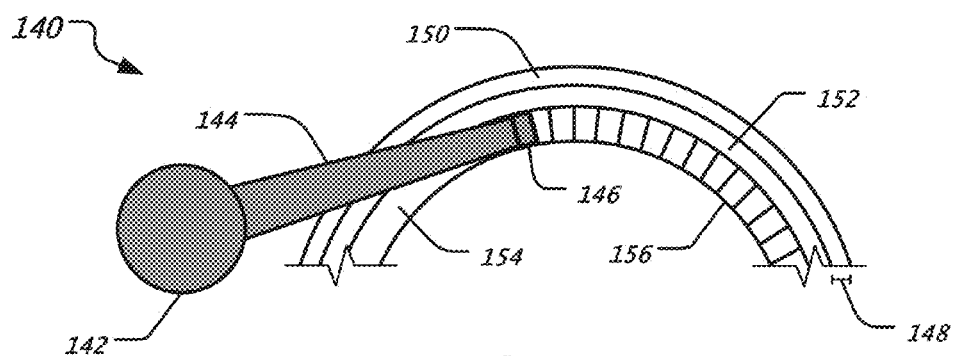
FIGS. 1B-1C show examples of writing data using Shingled Magnetic Recording (SMR) systems and techniques.

FIG. 1B shows an example 140 of SMR, as can be used in the disk drive of FIG. 1A. VCM 142 can be used to position an arm 144, and thus its read-write head(s) 146, over a desired track. In various implementations, the read-write head(s) 146 can include various numbers of head elements with combined or dedicated functions. For example the read-write head(s) 146 can include one or more readers and one writer. As another example, the read-write head(s) 146 can include a dedicated write head and two or more separate, additional dedicated read heads. Moreover, although a single arm 144 is shown in FIG. 1B, in some implementations more than one arm 144 (or other structures) can be used.

In any case, at least one of the read-write head(s) 146 can be used to write a first track 150, followed by a second track 152, and a third track 154. Since SMR is used to write the tracks 150, 152, 154, where the sectors of each track (e.g., a sector 156 of track 154) are written to partially overlap the previously written track, the track pitch 148 is smaller than the write head. Thus, the process of writing sectors in SMR involves writing tracks in an overlapped fashion, which can be thought of as similar to installing shingles on the roof of a house. In some cases, the sectors of one track are aligned with the sectors of a previous, overwritten track, and in other cases, the sectors are not aligned between adjacent tracks, depending on the implementation.

Figure 1C:
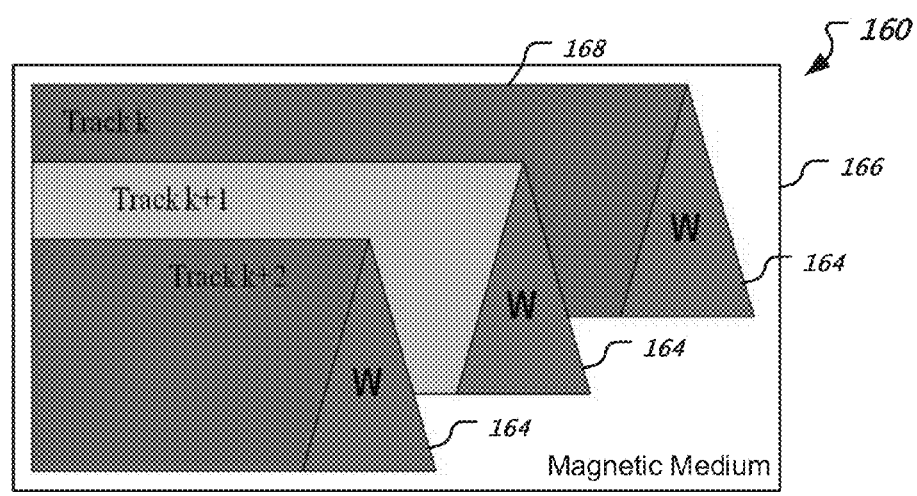

Note that the amount of overlap between tracks can be substantial. FIG. 1C shows a more detailed example 160 of writing data using SMR. A flux input to a write head 164 causes data to be encoded in the magnetic orientation of the grains of a magnetic medium 166. Each final sector of a shingled track 168 can be of a size matching only a far corner of the write head 164, as the head motion of the write head 164 lays down the tracks in progressive scans. Thus, a final shingled track 168 can be substantially smaller in size than the write head 164 used to write the track 168.

Moreover, since the track pitch is so small, reading back the track 168 can prove difficult, especially if the track pitch is smaller than the read head as well. Thus, in addition to 1D coding and decoding techniques, where information coming from a downtrack direction for the track being read is used to decide a bit of read data, 2D coding and decoding techniques can be used, where information coming from a cross-track direction for the track being read can also be used. In essence, SMR can be used to decouple track width from writer size through shingling (i.e., the track pitch does need not depend on the width of the write head), and TDMR can be used to decouple track width from reader size using multiple reads (i.e., two or more read heads can read from two or more tracks at a time).

Figure 1D:
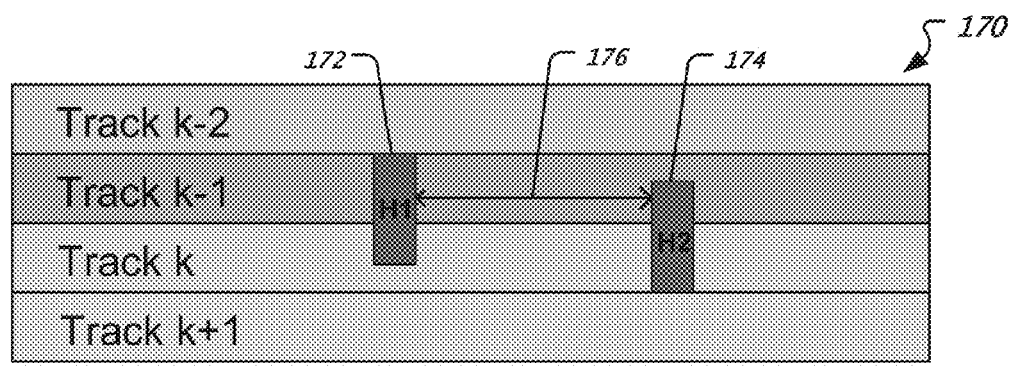
FIGS. 1D-1F show examples of reading data using Two Dimensional Magnetic Recording (TDMR) systems and techniques.

FIG. 1D shows an example of reading data using a TDMR system. Multiple SMR tracks 170 (Track k−2, Track k−1, Track k, and Track k+1) are encoded on a magnetic medium. A first read head 172 (H1) and a second read head 174 (H2) are used to read a given track (e.g. Track k). Note that the read heads 172, 174 are larger than the track pitch. Traditionally, the size of the read head would be smaller than the track width to prevent Inter Track Inferference (ITI), but here the TDMR system exploits ITI and effectively removes it. Thus, the read head need not be smaller than the track width.

As shown, H1 172 covers both Track k−1 and Track k and so obtains read signal arising from both. Likewise, H2 174 also covers Track k−1 and Track k and so obtains read signal arising from both, but in different amounts than that of H1 172. Because of the overlap of the read heads 172, 174 in the cross-track direction, the read heads 172, 174 must have an offset 176 between them in a downtrack direction. The amount of this offset 176 can vary with implementation. Moreover, while only two read heads 172, 174 are discussed here and below, it will be appreciated that the systems and techniques described herein are also applicable to implementations using more than two read heads. In addition, the alignment of the read heads with respect to the tracks 170 (in the cross-track direction) can also be changed.

Figure 1E:
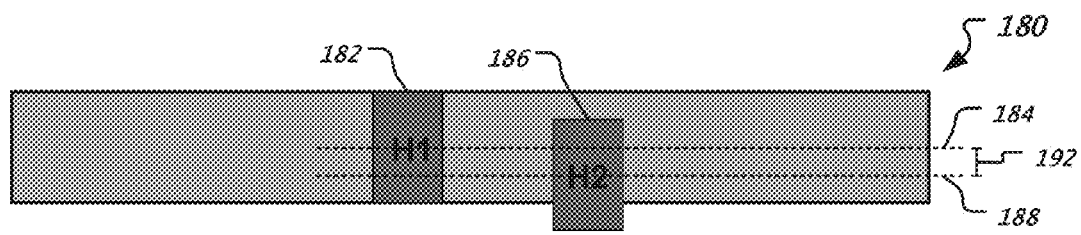
Figure 1F:
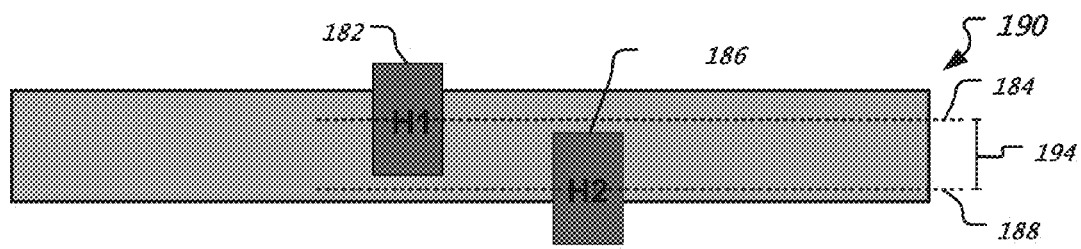

FIGS. 1E and 1F show examples of different alignment for read heads 182, 186 for reading data using TDMR systems and techniques. In these examples, each of H1 182 and H2 186 are shown as having the same width as the track being read, but in other implementations, these read heads 182, 186 can also be larger than the track, as shown in FIG. 1D. Moreover, in some implementations, each of the read heads 182, 186 need not have the same width as the other.

In a first configuration 180, H1 182 is largely on-track (e.g., the read head 182 has its center 184 aligned with the center of the track), and H2 186 has a substantial portion that is off-track (e.g., the read head 186 has its center 188 off the center of the track by an amount that is at least a quarter of the width of the read head 186). In a second configuration 190, each of the read heads 182, 184 have their centers 184, 188 not aligned with the center of the track being read.

Note that some implementations can use both configurations. This is more of a choice of what give the best performance, and is a function of head separation, track pitch, and bit length. In general, the two sensors (read heads) are separated along the track by some amount as indicated by item 176 in FIG. 1D. Since the sensors are located towards the tip of an actuator aim that swings to read tracks at an inner diameter (ID) of a disk and all the way out to an outer diameter (OD). With different angles of the actuator arm, the cross track separation changes. Therefore, an optimal alignment at ID, may be different from optimal alignment of medium diameter (MD) or OD, and a controller can be designed to change the reading technique being used in light of a particular TDMR reading situation.

In the first configuration 180, shown in FIG. 1F, H1 182 is the primary read head, and H2 186 is the secondary read head. In some implementations using this first configuration 180, due to the large ITI noise that can be experienced by the second reader 186, no decision driving timing/gain/baseline recovery should be performed on the corresponding read back signal from H2 186. Thus, rather than drive front end loops using H2 186, H1 182 is designated as the primary reader and all the front end loops (e.g., timing loop, gain loop, and baseline loop) can be driven from the signal produced by the primary reader 182. The read channel architecture can be designed to take advantage of this configuration 180.

In the second configuration 190, shown in FIG. 1F, neither of the read heads 182, 186 is assumed to be on-track, and both H1 182 and H2 186 can be off-track. In this configuration 190, neither of the read heads 182, 186 should be used as a primary reader, and gain and timing loops shouldn't be driven from an error signal generated from either read head individually since both signal will have large error. Rather, signals from the two heads 182, 186 can be combined, and with ITI removed, the combined and cleaned signal can be used to drive the front end loops. The read channel architecture can be designed to take advantage of this configuration 190. For example, gain and timing recovery can be done on a common error signal generated at the output of a 2D equalizer, as described in further detail below.

In addition, in either configuration 180, 190, the offset between the read heads 182, 186 in the cross-track direction can also be changed. In some cases, the overlap between the read heads 182, 186 can be substantial, i.e., more than half the width of one of the read heads, creating a narrow cross-track separation distance 192, e.g., an overlap that is three quarters of a common read head width, as shown in FIG. 1E. In some cases, the overlap between the read heads 182, 186 can be less, creating a wide cross-track separation distance 194, e.g., an overlap that is less than half of a common read head width, as shown in FIG. 1F. Note that the cross-track separation can vary from ID to OD, and so the controller can be designed to optimize its read processing to account for changes from ID to OD.

Figure 2A:
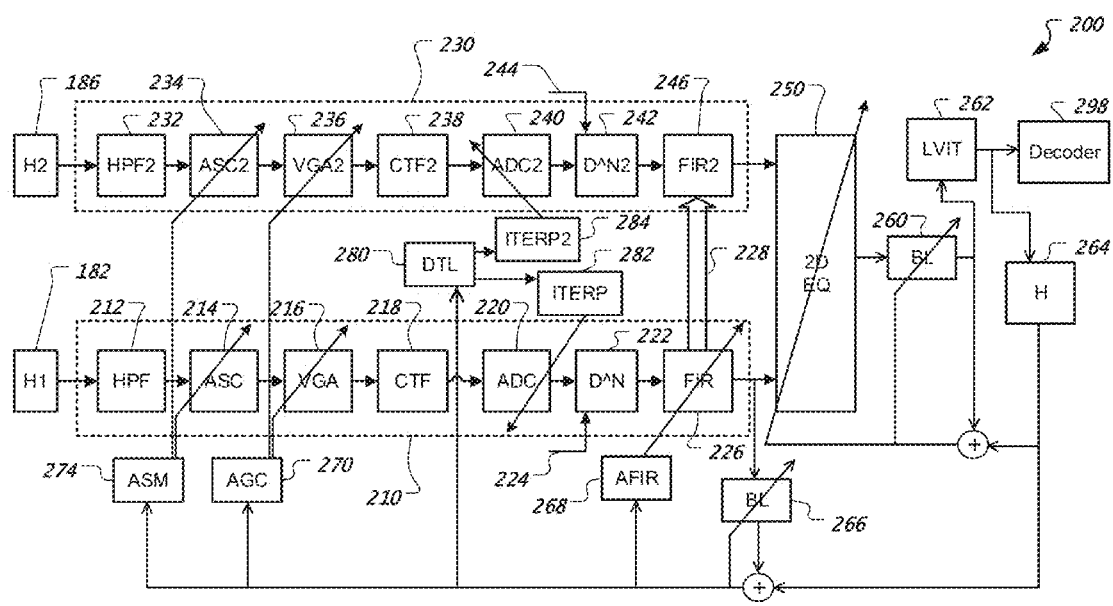
FIG. 2A shows a first example of a system architecture for TDMR read circuitry.

FIG. 2A shows a first example 200 of a system architecture for TDMR read circuitry. The TDMR architecture 200 includes first read channel 210 that receives a first analog signal from a first read head, e.g., H1 182. The TDMR architecture 200 also includes second read channel 230 that receives a second analog signal from a second read head, e.g., H2 186. Note that the TDMR architecture 200 can be designed to be used with either read head configuration 180 (with a primary read head H1) or read head configuration 190 (with no primary read head).

The first read channel 210 can include a High Pass Filter (HPF) 212, an Asymmetry Correction Block (ASC) 214, a Variable Gain Amplifier (VGA) 216, and a Continuous Time Filter (CTF) 218. The first read channel 210 can also include an Analog to Digital Converter (ADC) 220, a delay line 222, and a Finite Impulse Response (FIR) filter 226. The delay line 222 can be a programmable delay line (D^N) with a register that can be loaded with a value N to delay the digital signal by a specified number of clock cycles. As noted above, each of the read heads will be separated by some distance, and so each will have their own data read path, and their signals will need to be matched in time.

The second read channel 230 can have corresponding elements, including HPF2 232, ASC2 234, VGA2 236, CTF2 238, ADC2 240, D^N2 242, and FIR2 246. Note that which of the read heads H1 182 and H2 186 is leading and which is trailing will depend on their particular placement in the head assembly and the direction of disk rotation. In any case, the programmable delay lines 222, 242 can be programmed with appropriate values N (on input line 224) and N2 (on input line 244) to account for timing differences between the two read signals that are integer amounts of the clock cycle, which is used by the TDMR device in which the read channels 210, 230 reside, to match the two signals given their leading/trailing offset.

The respective FIRs 226, 246 are used in TDMR architecture 200 to equalize the respective digital signals (the ADC samples) to respective targets, and their output lines are connected to 2D equalizer 250. The 2D equalizer 250 operates to cancel the ITI and combine the digital signals in proper proportion. The 2D equalizer 250 can be two FIR filters with their outputs added together. After this 2D equalization and combination into a single output signal, the rest of the TDMR architecture 200 can include traditional elements of a 1D architecture.

In some implementations, a Baseline Loop (BL) unit 260 can receive the combined output signal of the 2D equalizer 250 and route the digital signal to a Linear Viterbi Detector (LVIT) 262 and to an adder through which feedback is received from a Viterbi target filter (H) 264 that has its input connected to an output of the LVIT 262, as shown in FIG.

2A. The output line of the LVIT 262 is also connected to additional processing circuitry, such as a decoder 298, which can be an iterative SOVA-LDPC (Soft Output Viterbi Algorithm-Low Density Parity-Check Code) decoder.

In some implementations of TDMR architecture 200, H1 182 is a primary read head, and all the front end loops for control of separate read channels 210, 230 are driven from H1 182. Thus, an output line of the FIR 226 can be routed to a BL unit 266 as shown. Output of the BL unit 266 can be combined in an adder with output of H 264 (e.g., the linear Viterbi decisions after passing through the Viterbi target filter) and used to create a single error signal to control an Adaptive FIR (AFIR) unit 268, a Digital Timing Loop (DTL) block 280, an Automatic Gain Control (AGC) block 270, and an Asymmetry Management (ASM) block 274.

Note that a single DTL 280 can be used to control separate interpolators (ITERP 282 and ITERP2 284) that interpolate timing of sampling for ADCs in the respective first and second read channels 210, 230. In addition, only one AFIR unit 268 need be used (on the primary reader's branch) since it controls the FIR 226, and the same FIR taps can be copied 228 from the FIR 226 to the FIR 246. Thus, the two FIRs 226, 246 act as duplicates of each other with the same filter coefficients, with each FIR 226, 246 equalizing ADC samples (delayed as appropriate) to look like the target (used in data detection) convolved with data written on the medium (i.e., each FIR equalizes its signal to remove read noise and do the channel shaping for the data detector). Due to this copying of the titter taps, only one adaptive unit is needed to adapt the operation of the first FIR 226 since the second FIR 246 is effectively adapted by the copying of the taps 228.

In other implementations of TDMR architecture 200, such as when using the no-primary head configuration 190 of FIG. 1F, not all of the front end loops need be driven from an error signal generated from only one branch. Since the second read channel 230 has its own FIR filter 246, one or more of the front end loops on either branch can be driven by its own individual signal. Note that the TDMR architecture 200 can be designed to switch between different operations modes for driving different parts of the front end loops, from one error signal from one channel versus two errors signals from respective channels, depending on the cross-track alignment of the read heads. For example, a second AGC can control VGA2 236 and a second ASM can control ASC2, with both being driven by an error signal generated from an output of FIR2 246.

Figure 2B:
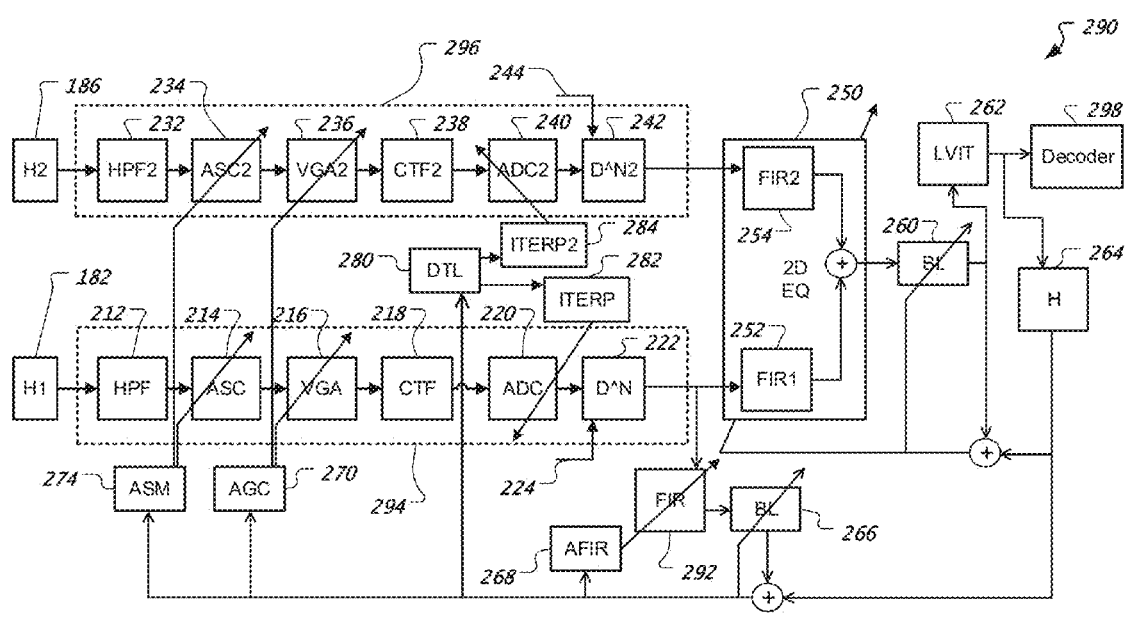
FIG. 2B shows a second example of a system architecture for TDMR read circuitry.

FIG. 2B shows a second example 290 of a system architecture for TDMR, read circuitry. As noted above for the TDMR architecture 200, the TDMR architecture 290 can include a 2D equalizer 250 with two FIR filters, FIR1 252 and FIR2 254. However, rather than performing 2D equalization on FIR samples equalized by front end FIR filters 226, 246 (i.e., using four FIR filters total) the TDMR architecture 290 performs 2D equalization directly on ADC samples. This can result in lower loop latency and smaller hardware costs since only three FIR filters are used, rather than four.

Figure 3A:
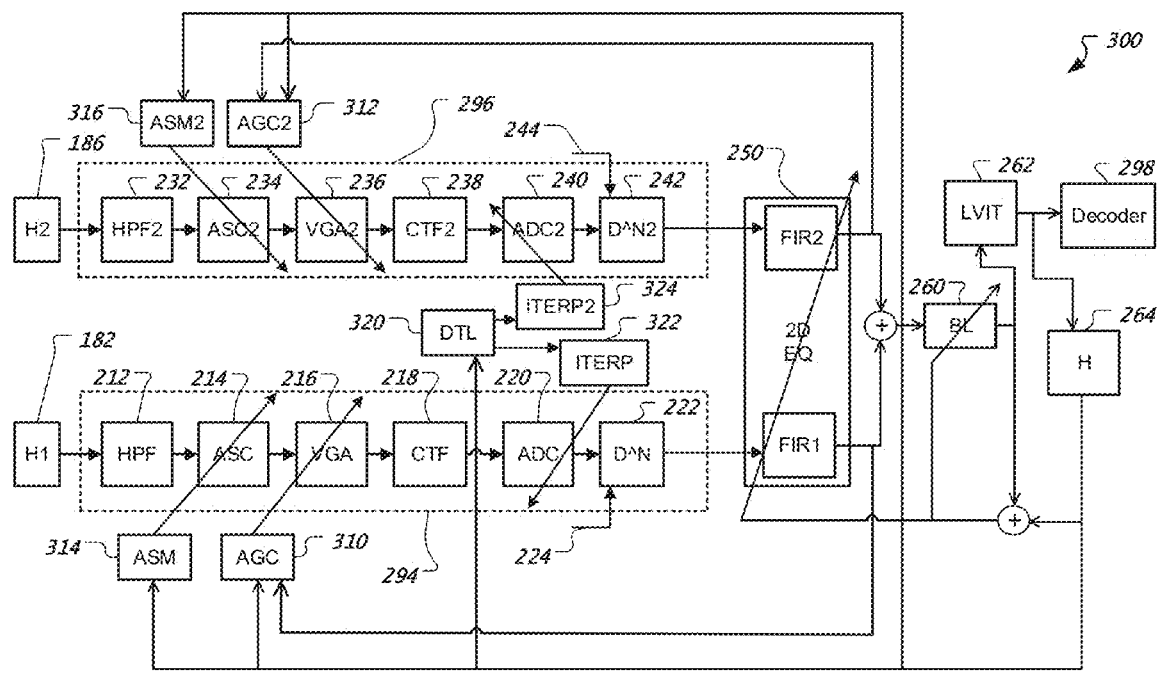
FIG. 3A shows a third example of a system architecture for TDMR read circuitry.
Figure 3B:
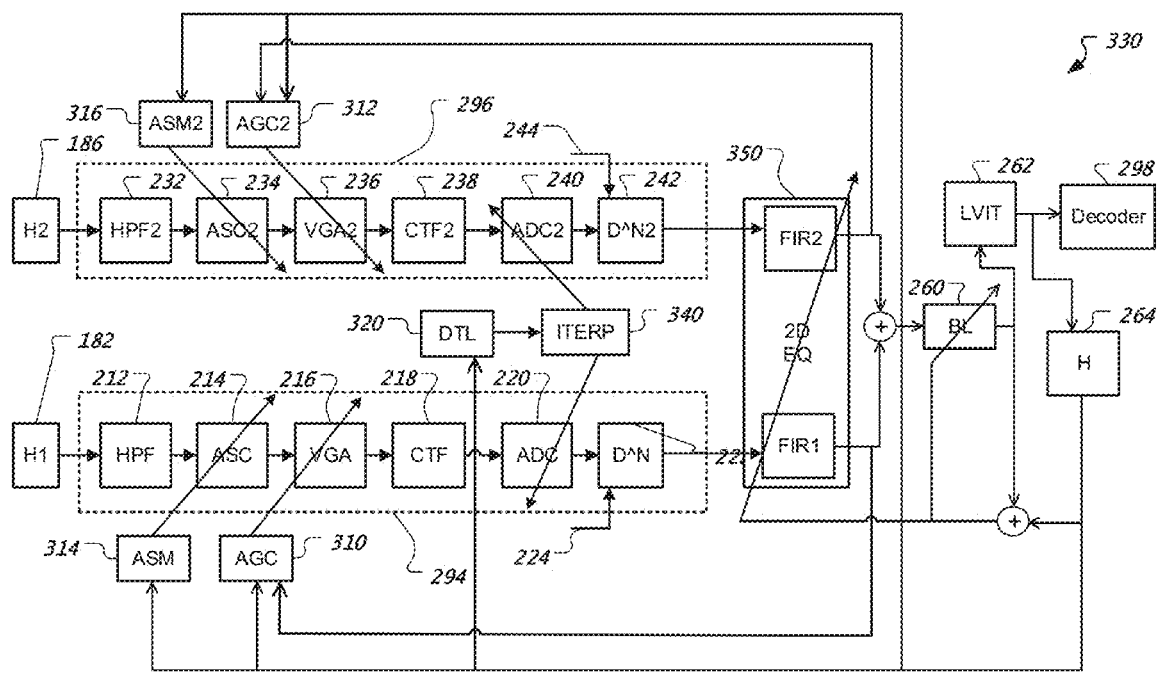
FIG. 3B shows a fourth example of a system architecture for TDMR read circuitry.

Many of the components of the TDMR architecture 290 are the same as the TDMR architecture 200, as shown by common reference numbers, and so are not described again here. As before, the 2D equalizer 250 can do FIR averaging and combination of the two digital signals. Note that in some cases the adder is considered part of the 2D equalizer, as shown in FIG. 2B, whereas in other cases the adder is considered as receiving the output lines of the 2D equalizer, as shown in FIGS. 3A and 3B. In any case, the TDMR system decodes one track using two signals that are generated from more than the one track, and so appropriate weights are used with each signal.

However, the TDMR architecture 290 includes different read channels 294, 296 in that the FIR filters have been removed. This reduces the length of the critical path (from read head to data detector) and reduces control loop latency. In addition, by using a primary head configuration, such as configuration 180 in FIG. 1E, where one of the heads is largely on track, e.g., with the center of H1 182 aligned with the center of the track so as to get most of its signal from the track being read, the TDMR architecture 290 can exploit this primary head geometry configuration and only include one additional FIR 292 for driving front end control loops (ASC, VGA, and timing loops). Thus, hardware costs can be reduced as compared with the TDMR architecture 200. Moreover, as is possible in the TDMR architecture 200, the TDMR architecture 290 uses one error signal (in this case generated from FIR 292, which is outside of the read channel) to drive one DTL 280 to control two interpolators 282, 284.

In some cases though, it may be desirable to reduce latency and hardware costs without requiring a primary head configuration. FIG. 3A shows a third example 300 of a system architecture for TDMR read circuitry, which can be used with no primary head, such as head geometry 190 from FIG. 1F. Many of the components of the TDMR architecture 300 are the same as the TDMR architecture 200, as shown by common reference numbers, and so are not described again here. In the TDMR architecture 300, the 2D equalization is performed directly on ADC samples, but the loops are driven from a 2D equalizer error signal. Note that this reduces by one again the number of FIR filters since only two FIR filters are used (FIR1 and FIR2 in the 2D equalizer 250).

Connecting the components of the TDMR architecture 300 as shown in FIG. 3A, the output of the BL unit 260 and the decisions convolved with the target can be used to generate the error signal after the 2D equalizer 250. This error signal can be used to drive the gain loop, the asymmetry loop, and the timing loop for both read channels 294, 296, including driving AGC 310, AGC2 312, ASM 314, ASM2 316, and an 320. Thus, the TDMR architecture 300 waits for the 2D equalizer 250 output to generate the error signal from which the front end loops are driven, and there is no need for one of the heads 182, 186 to be largely on track. The two read heads can be anywhere. Note that the error signal can be generated as the difference of equalizer output and reconstructed Viterbi output, in this case using the 2D EQ 350 output. The AGC 310 and AGC2 312 can use error signal and component FIR outputs to drive their respective loops. In addition, the ASC2 234 can be driven by ASM2 316, which can have its own input.

As with TDMR architectures 200 and 290, the TDMR architecture 300 also includes two interpolators (ITERP 322 and ITERP2 324), but this is still one digital timing loop. Note that in all the architectures there is only one digital timing loop because only one track is being read, even though the analog signals arise from data recorded on more than one track. Thus, the components of the TDRM architecture should lock to the timing of the one track being read. However, in some implementations, two separate interpolators need not be used.

FIG. 3B shows a fourth example 330 of a system architecture for TDMR read circuitry. Many of the components of the TDMR architecture 330 are the same as the TDMR architectures 200 and 300, as shown by common reference numbers, and so are not described again here. However, in the TDMR architecture 330, only a single interpolator 340 is used, and a modified 2D equalizer 350 is employed. This can simplify the architecture significantly.

As noted above, the programmable delay lines 222, 242 can be programmed to account for timing differences between the two read signals that are integer amounts of the clock cycle used by the TDMR device. In addition, the single interpolator 340 can be used for any needed finer adjustments that are less than an individual clock cycle and are common between the two read signals. But rather than accounting for timing differences that are fractional amounts (less than one) of the clock cycle using two separate interpolators, which involves added design complexity for synchronization, any fractional difference (less than one clock cycle) between the two read signals can be resolved by the FIR filters in the 2D equalizer 350.

For example, the two FIR filters in the 2D equalizer 350 can each be a ten tap FIR filter, which can adjust the delay of the signal being processed anywhere from zero to ten t (t being equal to one clock cycle of the device), even any fractional delay. Thus, by adjusting the coefficients of FIR1 and FIR2 in the 2D equalizer 350, the fractional timing difference between the two read signals can be removed. For example, referring to FIGS. 1D and 3B together, if the offset 176 between read heads 172 and 174 causes a signal timing difference of 5.6 t between the two read signals, 5 t of this timing difference can be removed by adjusting the values N and N2 input to registers in the programmable delay lines 222 and 242, and the remaining signal timing difference of 0.6 t between the two read signals can be removed by adjusting the coefficients of FIR1 and FIR2 in the 2D equalizer 350.

This approach can simplify the design significantly since a single clock can be generated to drive all the circuitry of the DTL 320 and interpolator 340, rather than having two synchronized clocks output from the DTL 320. Note that an interpolator is typically complicated circuitry that operates on a fraction of t, e.g., an interpolator can generate any resolution down to $1/128$ of a clock cycle, and such resolution numbers also need to be programmed. This is complicated from a circuit design perspective since the two clocks need to be synchronized at some point, such as before the signals are combined, which can be complicated to achieve with high frequency clocks. By reducing the architecture to one interpolator, the circuit design complexity is substantially reduced. Moreover, this single interpolator approach can be used in each of the TDMR architectures 200, 290, 300. Thus, the 2D equalizer 250 in each of these TDMR architectures can also handle a portion of the alignment of the two read signals.

Figure 4:
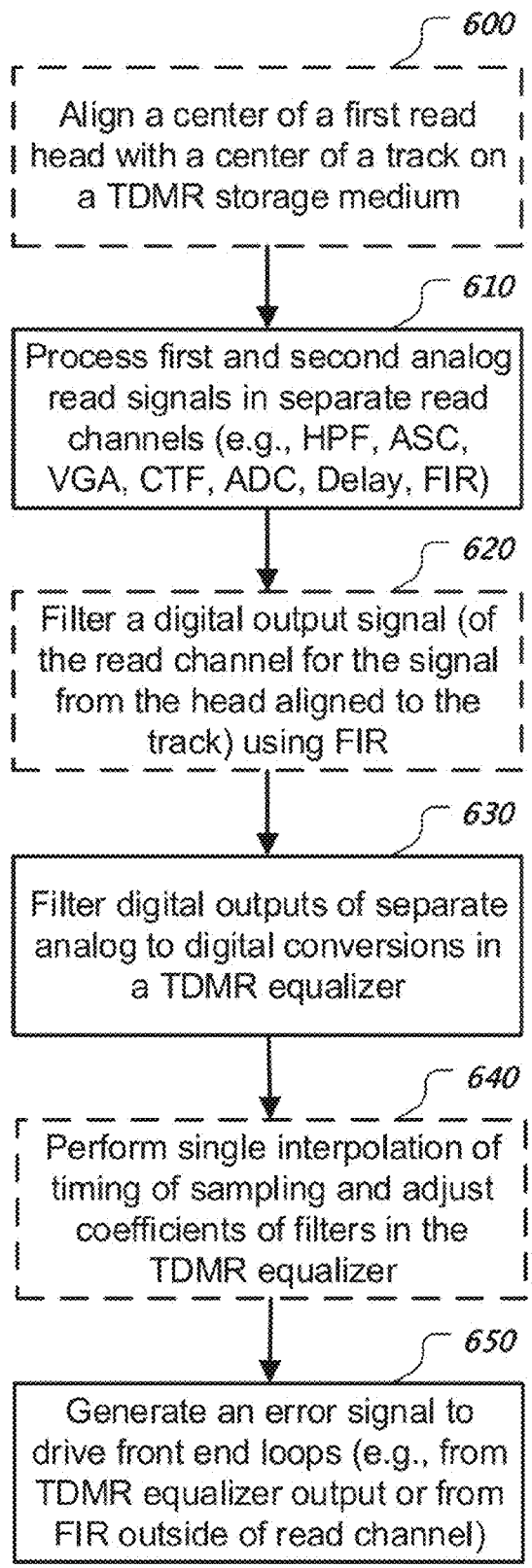
FIG. 4 is a flowchart showing an example of reading stored data in a TDMR storage system.

FIG. 4 is a flowchart showing an example of reading stored data in a TDMR storage system. In some implementations, at 600, a center of a first read head is aligned with a center of the track being read from the TDMR storage medium. For example, the read head 182 that generates the first analog read signal in the first read channel can be aligned with the track, as in the TDMR architecture 290 of FIG. 2B, or potentially the TDMR architecture 200 of FIG. 2A.

At 610, the first and second analog read signals from respective read heads are processed in separate read channels of a TDMR device, where the processing includes separate analog to digital conversions of the respective first and second analog read signals. The first and second analog read signals can be from respective first and second portions of the TDMR medium, such as described above connection with FIGS. 1D-1F. Thus, the first portion and the second portion at least partially overlap with a track on the TDMR storage medium.

In addition, the processing can include, in each of the separate read channels, high pass filtering, asymmetry control, variable gain amplification and continuous time filtering, before the separate analog to digital conversions. The processing can further include delaying a first digital output signal of a first of the separate analog to digital conversions by a first programmed amount of time and delaying a second digital output signal of a second of the separate analog to digital conversions by a second programmed amount of time. Moreover, in some implementations, the processing includes filtering both of the delayed digital output signals in the separate read channels using respective finite impulse response filters, such as described above in connection with FIG. 2A, and the processing can include copying taps from the first finite impulse response filter to the second finite impulse response filter so the first finite impulse response fitter and the second finite impulse response filter act as duplicates of each other.

In other implementations, no filtering is done within the read channels in the digital domain before TDMR filtering. For example, in some implementations, a digital output signal of the read channel for the signal from the head aligned at 600 to the track is filtered using a finite impulse response filter that is outside of the critical path of the read channel, at 620. In other implementations, this filtering at 620 is not used, and only the TDMR filtering is employed.

At 630, the digital outputs of the separate analog to digital conversions are filtered in a TDMR equalizer. In different implementations, this filtering can be performed on outputs from FIR filters in the read channels, or on delayed ADC samples directly. In some implementations, at 640, a single interpolation of timing of sampling for each of the separate analog to digital conversions is performed, and coefficients of filters in the TDMR equalizer are adjusted to account for a timing difference between the first and second analog read signals. As described above, this timing difference handled in the TDMR equalizer can be a fractional amount of a single clock cycle of the TDMR device, where the fractional amount is less than the time of the single clock cycle.

At 650, one or more error signals are generated to drive the font end loops of the first and second read channels. In some implementations, this can be one or more error signals generated from one or more outputs of the TDMR equalizer to drive asymmetry correction and variable gain amplification for both the first analog read signal and the second analog read signal, and to drive the single interpolation at 640. In other implementations, this can be a single error signal generated from the filtered digital output signal generated at 620, where this single error signal is used to drive asymmetry correction and variable gain amplification for both the first analog read signal and the second analog read signal, and to drive the single interpolation at 640.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may he specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A device comprising:
a first read channel to process a first input signal obtained from a Two Dimensional Magnetic Recording (TDMR) storage medium using a first read head, wherein the first read channel comprises a first analog to digital converter (ADC);
a second read channel to process a second input signal obtained from the TDMR storage medium using a second read head, wherein the second read channel comprises a second ADC;
a single digital timing loop (DTL) for both the first read channel and the second read channel, wherein the single DTL is configured to control interpolation of timing of sampling for the first and second ADCs; and
a two dimensional equalizer coupled with output lines of the first read channel and the second read channel;
wherein the first read head and the second read head are offset from each other in each of two dimensions.

2. The device of claim 1, wherein:
the first read channel further comprises a first asymmetry correction block (ASC), a first variable gain amplifier (VGA), a first programmable delay line, and first finite impulse response filter (FIR);
the second read channel further comprises a second ASC, a second VGA, a second programmable delay line, and a second FIR; and
FIR taps for the first FIR are copied from the first FIR to the second FIR.

3. The device of claim 1, wherein:
the first read channel further comprises a first asymmetry correction block (ASC), a first variable gain amplifier (VGA), and a first programmable delay line;
the second read channel further comprises a second ASC, a second VGA, and a second programmable delay line; and
the device further comprises a finite impulse response filter connected with an output line of the first programmable delay line, the finite impulse response filter lying outside of the first read channel and being configured and arranged to generate an error signal to drive the ASCs and VGAs of the first and second read channels, and to drive the single DTL.

4. The device of claim 1, wherein:
the first read channel further comprises a first asymmetry correction block (ASC), a first variable gain amplifier (VGA), and a first programmable delay line;
the second read channel further comprises a second ASC, a second VGA, and a second programmable delay line; and
the device is configured and arranged to generate an error signal from an output of the two dimensional equalizer to drive the ASCs and VGAs of the first and second read channels, and to drive the single DTL.

5. The device of claim 1, comprising a single interpolator controlled by the single DTL to perform the same interpolation of timing of sampling for the first and second ADCs for both the first read channel and the second read channel; and
wherein coefficients on taps of respective FIR filters in the two dimensional equalizer are adjusted to account for a timing difference between the first input signal and the second input signal, wherein the timing difference is a fractional amount of a single clock cycle of the device, the fractional amount being less than the time of the single clock cycle.

6. The device of claim 1, wherein the first read channel, the second read channel, the single DTL, and the two dimensional equalizer comprise circuitry located in a hard disk controller for a TDMR storage apparatus, the hard disk controller being included on a system on chip.

7. A system comprising:
a Two Dimensional Magnetic Recording (TDMR) storage apparatus comprising a magnetic media disk, which is mounted on a spindle and motor assembly, and a head assembly comprising at least a first read head and a second read head, wherein the first read head and the second read head are offset from each other in each of two dimensions; and a storage controller coupled with the TDMR storage apparatus, the storage controller comprising a first read channel to process a first input signal obtained from the magnetic media disk of the TDMR storage apparatus using the first read head, and a second read channel to process a second input signal obtained from the magnetic media disk of the TDMR storage apparatus using the second read head;

wherein the first read channel comprises a first analog to digital converter (ADC), the second read channel comprises a second ADC; and wherein the storage controller comprises a single digital timing loop (DTL) for both the first read channel and the second read channel, the single DTL being configured to control interpolation of timing of sampling for the first and second ADCs, and the storage controller comprises a two dimensional equalizer coupled with output lines of the first read channel and the second read channel.

8. The system of claim 7, wherein:
the first read channel further comprises a first asymmetry correction block (ASC), a first variable gain amplifier (VGA), a first programmable delay line, and first finite impulse response filter (FIR);
the second read channel further comprises a second ASC, a second VGA, a second programmable delay line, and a second FIR; and
FIR taps for the first FIR are copied from the first FIR to the second FIR so the first FIR and the second FIR act as duplicates of each other.

9. The system of claim 7, wherein:
the first read channel further comprises a first asymmetry correction block (ASC), a first variable gain amplifier (VGA), and a first programmable delay line;
the second read channel further comprises a second ASC, a second VGA, and a second programmable delay line; and
the storage controller further comprises a finite impulse response filter connected with an output line of the first programmable delay line, the finite impulse response filter lying outside of the first read channel and being configured and arranged to generate an error signal drive to drive the ASCs and VGAs of the first and second read channels, and to drive the single DTL.

10. The system of claim 7, wherein:
the first read channel further comprises a first asymmetry correction block (ASC), a first variable gain amplifier (VGA), and a first programmable delay line;
the second read channel further comprises a second ASC, a second VGA, and a second programmable delay line; and
the storage controller is configured and arranged to generate an error signal from an output of the two dimensional equalizer to drive the ASCs and VGAs of the first and second read channels, and to drive the single DTL.

11. The system of claim 7, wherein the storage controller comprises a single interpolator controlled by the single DTL to perform the same interpolation of timing of sampling for the first and second ADCs; and
wherein coefficients on taps of respective FIR filters in the two dimensional equalizer are adjusted to account for a timing difference between the first input signal and the second input signal, wherein the timing difference is a fractional amount of a single clock cycle of the storage controller, the fractional amount being less than the time of the single clock cycle.

12. The system of claim 7, wherein the storage controller is integrated with the TDMR storage apparatus.

13. A method comprising:
processing, in a first read channel, a first input signal obtained from a Two Dimensional Magnetic Recording (TDMR) storage medium using a first read head, wherein the first read channel comprises a first analog to digital converter (ADC);
processing, in a second read channel, a second input signal obtained from the TDMR storage medium using a second read head, wherein the second read channel comprises a second ADC;
controlling interpolation of timing of sampling for the first and second ADCs using a single digital timing loop (DTL) for both the first read channel and the second read channel; and
performing two dimensional equalization on outputs of the first read channel and the second read channel, wherein the first read head and the second read head are offset from each other in each of two dimensions.

14. The method of claim 13, wherein:
the first read channel further comprises a first asymmetry correction block (ASC), a first variable gain amplifier (VGA), a first programmable delay line, and first finite impulse response filter (FIR);
the second read channel further comprises a second ASC, a second VGA, a second programmable delay line, and a second FIR; and
FIR taps for the first FIR are copied from the first FIR to the second FIR.

15. The method of claim 13, wherein:
the first read channel further comprises a first asymmetry correction block (ASC), a first variable gain amplifier (VGA), and a first programmable delay line;
the second read channel further comprises a second ASC, a second VGA, and a second programmable delay line; and
the method comprises generating an error signal to drive the ASCs and VGAs of the first and second read channels, and to drive the single DTL, using a finite impulse response filter connected with an output line of the first programmable delay line, wherein the finite impulse response filter lies outside of the first read channel.

16. The method of claim 13, wherein:
the first read channel further comprises a first asymmetry correction block (ASC), a first variable gain amplifier (VGA), and a first programmable delay line;
the second read channel further comprises a second ASC, a second VGA, and a second programmable delay line; and
the method comprises generating an error signal from an output of the two dimensional equalization to drive the ASCs and VGAs of the first and second read channels, and to drive the single DTL.

17. The method of claim 13, comprising:
controlling a single interpolator using the single DTL to perform the same interpolation of timing of sampling for the first and second ADCs for both the first read channel and the second read channel; and
adjusting coefficients on taps of respective FIR filters performing in the two dimensional equalization to account for a timing difference between the first input signal and the second input signal, wherein the timing difference is a fractional amount of a single clock cycle of the device, the fractional amount being less than the time of the single clock cycle.

18. The method of claim 13, wherein the first read channel, the second read channel, the single DTL, and the two dimensional equalizer comprise circuitry located in a hard disk controller for a TDMR storage apparatus, the hard disk controller being included on a system on chip.

\* \* \* \* \*